(No Model.)
J. W. RIGLANDER.
DEVICE FOR MOUNTING COUNTERSHAFTS.
No. 441,977. Patented Dec. 2, 1890.
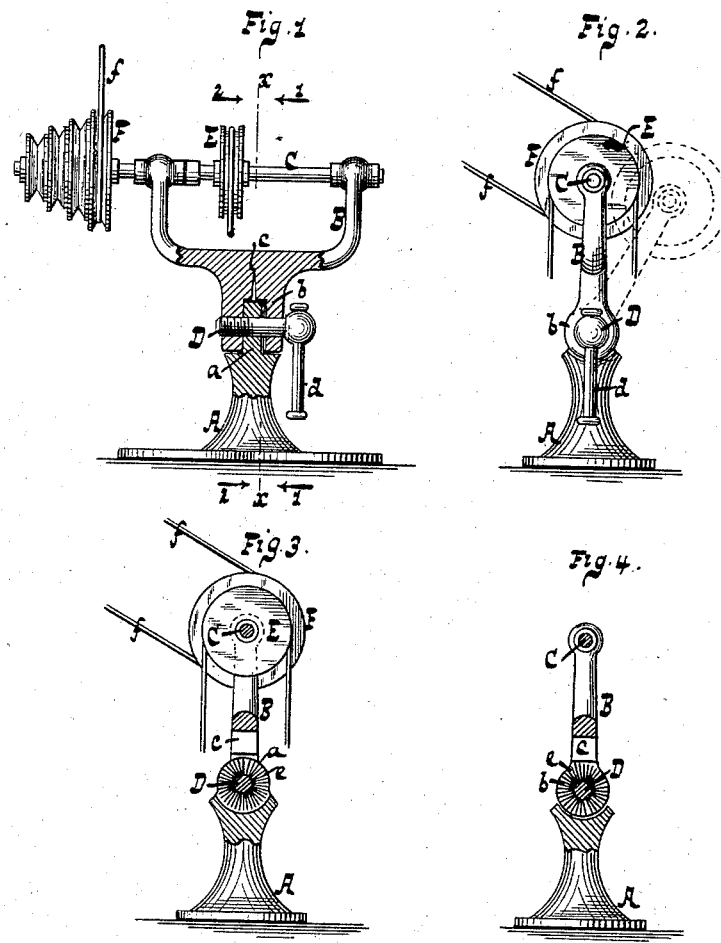
WITNESSES:
INVENTOR:
Jacob W. Riglander.
BY
Van Santvoord & Hauff
ATTORNEYS

UNITED STATES PATENT OFFICE.

JACOB W. RIGLANDER, OF NEW YORK, N. Y.

DEVICE FOR MOUNTING COUNTER-SHAFTS.

SPECIFICATION forming part of Letters Patent No. 441,977, dated December 2, 1890.

Application filed April 17, 1890. Serial No. 348,373. (No model.)

*To all whom it may concern:*

Be it known that I, JACOB W. RIGLANDER, a citizen of the United States, residing at New York, in the county and State of New York, have invented new and useful Improvements in Devices for Mounting Counter-Shafts, of which the following is a specification.

This invention relates to certain improvements in the construction of devices for mounting counter-shafts, said improvements being pointed out in the following specification and claim, and illustrated in the accompanying drawings, in which—

Figure 1 represents a face view, partly in section. Fig. 2 is an end view. Fig. 3 is a transverse section in the plane $x\ x$, Fig. 1, looking in the direction of arrow 1. Fig. 4 is a similar section looking in the direction of arrow 2.

In the drawings, the letter A designates a bracket, which is firmly secured to the work-bench or to any suitable fixed support, and which is provided with a rigid lug $a$, the faces of which are flat and parallel to each other.

B is a yoke, which forms the bearings for the counter-shaft C, and which is provided with two ears $b\ b$, the inner faces of which are flat and at such a distance apart that they hug the faces of the lug $a$ closely when the yoke B is adjusted on the standard A. Through the ears $b\ b$ and the lug $a$ extends the clamping-screw D, which forms the pivot on which the yoke B can swing and which is by preference provided with a lever $d$, by means of which it can be turned.

In the body of the yoke B, between the ears $b\ b$, is a slot $c$, so that when the clamping-screw is tightened up the inner faces of the ears $b\ b$ will be drawn up tight and flat against the faces of the lug $a$, and the friction between these faces will be sufficient to retain the yoke in the desired position. If desired, however, the surface or surfaces of the lug $a$ and the inner surfaces of one or both of the ears $b\ b$ may be provided with fine teeth $e$, Figs. 3 and 4, which interlock when the clamping-screw is drawn up tight, so as to lock the yoke in the desired position.

On the counter-shaft C are mounted the pulleys E and F, and motion is transmitted to the counter-shaft by means of a belt running over the pulley E, while a belt $f$, running over the pulley F, serves to transmit the motion from the counter-shaft to the working-machine. If the belt $f$ becomes slack, it can be tightened by moving the yoke B from the position shown in full lines in Fig. 2 toward the position shown in dotted lines in said figure, and it will be readily understood that in order to retain the belt $f$ taut, means, substantially as above described, must be provided to lock the yoke B firmly in the desired position.

What I claim as new, and desire to secure by Letters Patent, is—

The combination, with the bracket A and its flat-faced rigid lug $a$, of the yoke B, carrying the counter-shaft C and having the flat-faced parallel ears $b$, constructed to hug the lug $a$ of the bracket, said yoke between its ears being provided with a slot $c$, and the clamping-screw D, substantially as described.

In testimony whereof I have hereunto set my hand in the presence of two subscribing witnesses.

JACOB W. RIGLANDER.

Witnesses:
WM. C. HAUFF,
E. F. KASTENHUBER.